United States Patent
Khushu

(10) Patent No.: US 8,032,156 B2
(45) Date of Patent: Oct. 4, 2011

(54) PROCEDURE TO INCREASE POSITION LOCATION AVAILABILTY

(75) Inventor: Sanjeev Khushu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 10/935,785

(22) Filed: Sep. 7, 2004

(65) Prior Publication Data

US 2006/0052115 A1 Mar. 9, 2006

(51) Int. Cl.
*H04Q 7/20* (2006.01)
(52) U.S. Cl. .................... 455/456.3; 455/456.1
(58) Field of Classification Search ............... 455/456.1, 455/563, 422.1, 446, 12.1, 436, 450, 452.2, 455/509, 464, 67.11, 411, 453, 67.13; 370/469, 370/237, 343, 392, 329, 252, 310, 520, 401, 370/450, 452.2, 241, 408, 328, 235, 230.1, 370/331, 260, 389, 254, 340, 336, 242, 232
See application file for complete search history.

(56) References Cited

U.S. PATENT DOCUMENTS

| | | | |
|---|---|---|---|
| 5,982,324 | A | 11/1999 | Watters |
| 5,999,126 | A | 12/1999 | Ito |
| 2002/0086682 | A1 * | 7/2002 | Naghian ..................... 455/456 |
| 2002/0132626 | A1 | 9/2002 | Tsunehara |
| 2003/0008663 | A1 * | 1/2003 | Stein et al. .................... 455/456 |
| 2003/0064735 | A1 * | 4/2003 | Spain et al. .................... 455/456 |
| 2003/0146871 | A1 * | 8/2003 | Karr et al. ..................... 342/457 |
| 2004/0180671 | A1 * | 9/2004 | Spain, Jr. ................... 455/456.1 |
| 2004/0203885 | A1 * | 10/2004 | Quaid ....................... 455/456.1 |
| 2005/0003828 | A1 * | 1/2005 | Sugar et al. ............... 455/456.1 |
| 2005/0014512 | A1 * | 1/2005 | Gerecht .................... 455/456.1 |

FOREIGN PATENT DOCUMENTS

| | | |
|---|---|---|
| DE | 10105901 | 8/2002 |
| EP | 1251362 | 10/2002 |
| JP | 2000019238 | 1/2000 |
| JP | 2002310692 | 10/2002 |
| RU | 2178894 | 1/2002 |
| WO | 03089954 | 10/2003 |

OTHER PUBLICATIONS

International Search Report—PCT/US05/032014, International Search Authority—European Patent Office—Oct. 27, 2006.
Written Opinion—PCT/US05/032014, International Search Authority—European Patent Office—Oct. 27, 2006.
International Preliminary Report on Patentability—PCT/US05/032014, The International Bureau of WIPP, Geneva, Switzerland—Mar. 13, 2007.
European Search Report—EP09152560—Munich—Mar. 5, 2009.
"3rd Generation Partnership Project; Technical Specification Group Services and System Aspects, Digital cellular telecommunications system (Phase 2+); Location Services (LCS): (Functional description)—Stage 2 (Release 1998)", 3GPP TS 03.71 V7.6.0, Section 7.6.1.2, Jun. 2006.

* cited by examiner

*Primary Examiner* — Melody Mehrpour
(74) *Attorney, Agent, or Firm* — Thien T. Nguyen

(57) ABSTRACT

A device, method and system are provide which permits the methodology used to make the position determination to change dynamically in connection with achieving a position fix of a desired accuracy.

39 Claims, 5 Drawing Sheets

PROCEDURE TO INCREASE POSITION LOCATION AVAILABILTY

BACKGROUND

The ability to locate persons, vehicles, and the like has become more important in recent years, particularly in view of new technologies being introduced and increasing concerns over safety and security. A person or vehicle can be located by determining the location of a mobile radio device carried by the person or vehicle. For example, it is desirable to provide a cellular telephone system with the ability to determine the geographic location of an individual cell phone used to report an emergency so that such location can be reported to emergency response workers such as police, fire and ambulance services.

Several schemes for determining one's position on Earth are available. One way to determine position involves the use of the global positioning system (GPS). The GPS was originally conceived and developed by the U.S. Department of Defense as a military navigation system. Over time, elements of the system have become increasingly available for civilian use. The GPS uses a constellation of 24 satellites, in a geostationary orbit, whereby position can be determined by timing satellite signal journeys from a GPS satellite to a GPS receiver. Five spare orbiting satellites are provided primarily for backup in case one of the 24 satellites fail. The satellites transmit spread-spectrum signals on two frequency bands L1 (1575.42 MHz) and L2 (1223.6 MHz). The signals are modulated by two pseudo-random noise codes; a coarse/acquisition (C/A) code and a precision (P) code. The C/A code in the L1 band is the code pertinent to civilian applications. Additionally, the GPS signal is modulated with a data message commonly referred to as the GPS navigation message.

Typically, a GPS receiver employs a trilateration scheme in an effort to obtain a position fix. For instance, a GPS-derived position can be accomplished using two-dimensional trilateration. For example, signals from three satellites can be used to determine position based on the intersection of three intersecting circles. More specifically, each satellite signal can provide a radius in which the GPS receiver can lie. Two intersecting radii allow the position determination to be narrowed to the area of intersection. Another satellite signal can provide a third radius indicative of the position of the GPS receiver since all three radii should intersect at a single point. Expanding the forgoing concept to three-dimensional trilateration, each satellite signal can be used to indicate a sphere whereby three intersecting spheres can used to determine position which includes altitude information. More satellite signals can be used, and typically are used to improve accuracy.

At the GPS receiver, the satellite signal is demodulated after it is matched and synchronized with a pseudo-random noise code. The GPS receiver uses the GPS navigation message to calculate satellite signal transit times in addition to the coordinates of the GPS satellite. Position measurement by a GPS receiver can typically be accomplished within 15 meters (50 feet). However, the accuracy of these calculations are dependent upon measurement accuracy and satellite configuration. Atmospheric conditions can cause ionospheric delays. Additionally, uncertainties in satellite orbits can contribute to errors since, axiomatically, satellite orbits degrade over time. Reliance upon position indication using GPS data can be additionally problematic in view of public safety concerns in today's environment.

In order to address signal availability problems associated with the GPS, server-assisted GPS was introduced in the late 1990s. Stationary server computers are provided with a stationary GPS receiver for receiving GPS satellite signals. The stationary GPS receivers are associated with an antenna having a full view of the sky in order to allow continuous monitoring of the signals from all visible GPS satellites. A radio interface is provided with each server to allow communication with mobile GPS stations. In connection with a position query about a mobile GPS unit's position, the server transmits its GPS satellite information, obtained from its stationary GPS receiver, to the mobile GPS unit. This information includes a list of observable GPS satellites and data which allow the mobile GPS receiver to synchronize and match psuedo-random noise codes with those codes of the GPS satellites. The mobile GPS receiver transmits its collected GPS data to the server. The server, in turn, computes the position of the mobile GPS receiver from the data provided by the mobile GPS and the stationary GPS. While this scheme permits greater accuracy over non server-assisted GPS, satellite signal availability can still cause problems in acquiring an accurate position.

The enhanced signal strength (ESS) system employs a position location scheme which is independent of the GPS. Three-dimensional information covering the terrain including buildings, structures and other obstructions is collected in order to model radio frequency signal propagation characteristics for a wireless transmitting antenna in a given geographic area of interest. The results of the modeling are stored in a database. The position of a mobile locator is determined in connection with the locator measuring the signal strength of a signal from a number of wireless transmitters. The position is calculated by the system using input information from the mobile locator and the stored database information. This system has been used in Japan in connection with the Personal Handy Phone System (PHS).

Other schemes for determining position, without using the GPS, make use of either the angle of arrival (AOA) of signals at receivers or the time difference of arrival (TDOA) of signals at receivers.

The network-based angle of arrival scheme determines the location of a mobile station (as, for example, a mobile phone, a personal digital assistant with wireless communications capability, a portable computer with wireless communications capability, a pager or other personal communications device) by determining the angle from which a signal is arriving at two or more fixed antenna sites. For instance, signal direction or angle of arrival at each site can be determined from the difference in time of arrival of incoming signals at different elements of a single fixed antenna at that site. For instance, a two element phased array antenna can be used to cover angles between 60° and −60°. A six element phased array antenna, which is equivalent to three antennas with 2 pairs of elements, can cover 360°. Equipment within the communication network combines the angle data from multiple sites to determine the location of the mobile station. Proper angle measurement and the geometric relationship between the mobile station and fixed antennas can affect position measurement. Proximity of the mobile station to the mid point between two fixed antennas can cause significant position measurement error. For this reason, it is desirable to use three or more antenna sites in making AOA measurements.

The time difference of arrival scheme of determining position is another network-based solution which measures the time difference of arrival of a radio signal to at least two antenna sites. Using the speed of an electromagnetic wave and known transmit and receive times, the distance between a fixed antenna and mobile station can be determined. The processed information is translated into longitude and latitude position readings. The accuracy of synchronized clocking information necessary to properly compute TDOA is critical to proper position measurement. Synchronized accurate clocking can sometime be problematic in TDOA measurement. TDOA position measurements can suffer as a consequence thereof. A mere micro second clocking error can contribute to several meters of error in position measurement.

Forward link trilateration can also be employed to determine position whereby the time difference of signal arrival from a base station antenna to a mobile station can be calculated by measuring the phase difference between pseudo-random noise coded signals being transmitted from at least two antennas to the mobile station. This scheme is particularly useful for code division multiple access (CDMA) systems. Advanced forward link trilateration (AFLT) is a variation of this scheme wherein the mobile station and base stations reverse roles. In AFLT, the position of the mobile station is fixed in connection with the base stations receiving transmissions from the mobile station. In AFLT, the mobile station measures CDMA phase offsets of different pilot phase noises and reports them to the position determination entity at the network. The position determination entity uses the different pilot phase measurements to perform forward link trilateration to compute the position fix for the reporting entity.

Fingerprinting provides another approach to determining the position of a mobile station. Radio frequency signal characteristics associated with various regions in a signal transmission area are collected in a database. Each grouping of signal characteristics for a region is known as a fingerprint. The position of a mobile station is determined by comparing an RF data sample collected by the mobile station to fingerprint data in the database. The comparison can be made at the mobile station or at the server holding the fingerprint data. The fingerprint data collected benefits from the collection of multi-path signals which arise through indirect signal paths from transmitter to receiver. While not subject to many of the problems associated with other position identifying technologies, fingerprinting requires substantial work in data collection and is therefore economically feasible only for highly populated, highly concentrated metropolitan areas.

Thus, as described above, numerous individual position-determining schemes are known in the art. These schemes can be categorized broadly as mobile station assisted modes (MS-Assisted mode) and mobile station based/standalone mode (MS-Based/Standalone modes). In the MS-Assisted mode, the position of the mobile station is determined by the by a computer commonly referred to as the Network/position Determination Entity (PDE), which computer is connected to the communications network. The PDE can employ one of the methodologies outlined above as, for example, TDOA, AOA, ESS, etc. In MS-Based/Standalone mode, the mobile station computes its own position location using its processor using data available at the mobile station. One example of an MS-Based/Standalone system is a system in which the mobile station is equipped with GPS receiving and processing capability, and determines its position based on GPS signals received at the mobile station. Individual scheme of position determination depends upon different elements/resources which are susceptible to different types of errors. For instance, network connection is needed in all GPS MS-Assisted methods regardless of the scheme (GPS, GPS plus AFLT, etc.) chosen. Even if the GPS measurements are excellent, the MS-Assisted method is going to fail if the network connection fails. Therefore in this instance, a stand-alone GPS methodology would provide a better location estimate.

Each of the foregoing schemes for determining position may be inaccurate or unavailable on occasion as noted above. Thus, a mobile station or network using any of these known position-determining schemes may fail to obtain any result when asked to determine the current position of the mobile station or may obtain an inaccurate result. A need therefore exists to create a method for more reliably determining the position of a mobile station with greater confidence.

SUMMARY

One aspect disclosed provides a method of determining the location of a mobile device. A method according to this aspect includes determining the position of the mobile station using a first scheme of position determination and, if the first scheme does not yield an acceptable position result, repeating the determining using at least one further scheme of position determination different from the first scheme in at least some repetitions until (i) a repetition returns an acceptable position result or (ii) all available position-determining schemes have been used. The different schemes used in the method may use measurements of different signals or different measurements of signal characteristics as the basis for the position result. It is unlikely that all of these different schemes will fail to return an acceptable position result; thus, the reliability of the system is improved. In effect, the method selects a position-determining scheme which gives acceptable results under the prevailing conditions. The system switches schemes dynamically as conditions require.

A further aspect provides a method of determining the position of a mobile station including making position determinations for the mobile station, according to a plurality of different schemes, and determining an estimate of error for each position determination scheme. The method according to this aspect may include the further choosing one position determination method having a smallest estimate of error, and selecting as the position of the mobile station a position result provided by the chosen position determination. This method effectively selects a position-determining scheme which gives the best available results under prevailing conditions, so that here again the system switches schemes dynamically to meet changing conditions. Alternatively, the method according to this aspect may include calculating the position of said mobile station by combining a plurality of the position results as, for example, by computing a weighted average of the position results.

A further aspect provides a mobile device and systems for locating a mobile device.

DETAILED DESCRIPTION

Figure 1:
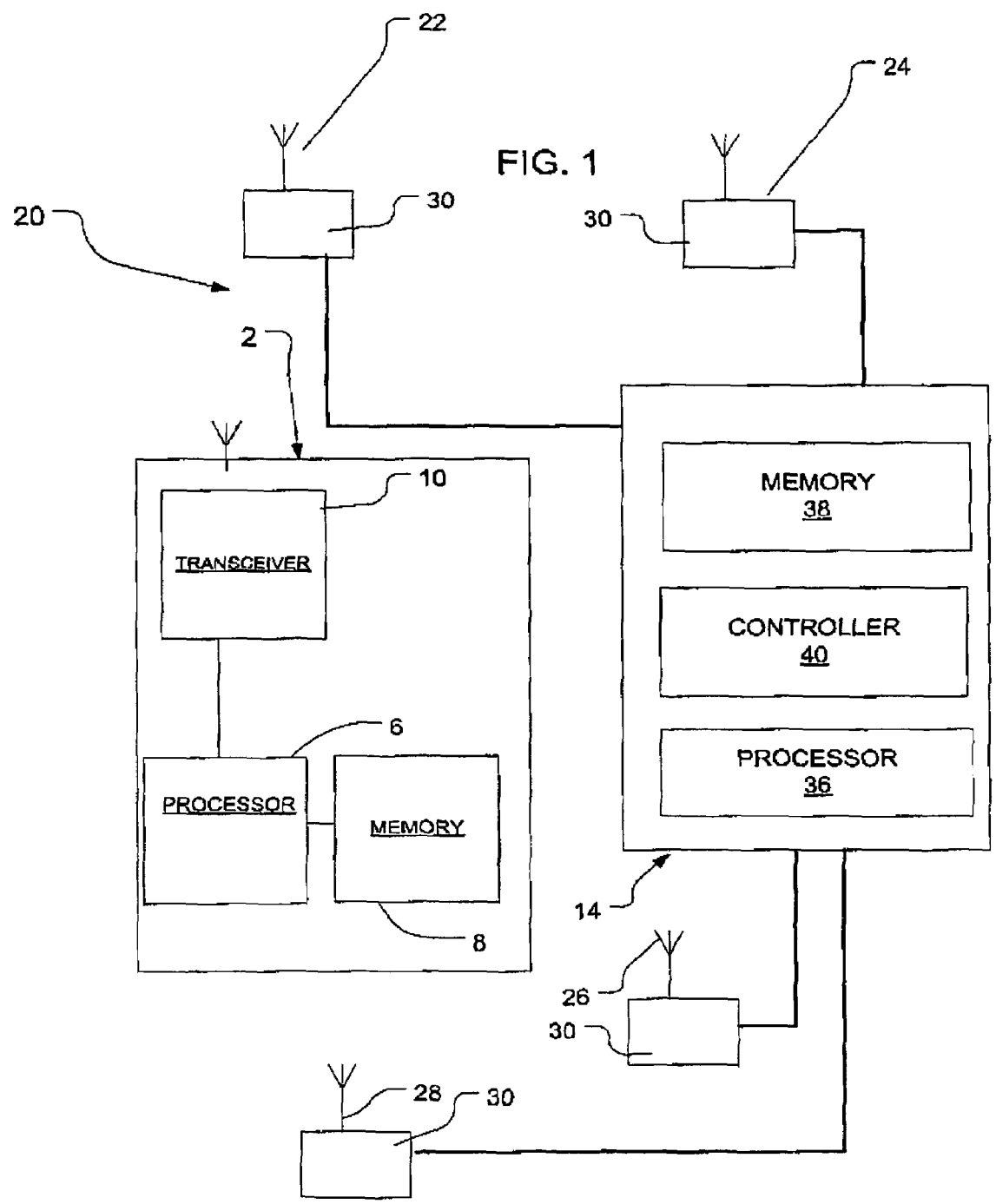
FIG. 1 is a functional block diagram of one embodiment of a system.

FIG. 1 illustrates, in functional block diagram form, a system including a mobile station 2 and communications network 20 and associated position determining entity (PDE) 14.

Mobile station 2 includes a processor 6, memory 8, and transceiver (transmitter/receiver) 10. As used herein, the term "transceiver" refers to any assemblage of components which will perform transmitting and receiving functions. Thus, transceiver 10 may include common components used in both functions or entirely separate components for performing transmitting and receiving functions. Transceiver 10 is capable of transmitting and receiving signals appropriate for communication with network 20.

The transceiver is connected to processor 6 so that the processor can control the operations of the transceiver and so that the processor can send data to the communications network 20, and receive data from the communications network, via the transceiver. The mobile station 2 typically also includes components (not shown) for user communication and user control. For example, where the mobile station is a cell phone, the mobile station will include a conventional microphone and speaker linked to the transceiver under the control of the processor, and a conventional keypad and display (not shown) for entering and displaying data. In the particular embodiment depicted, transceiver 10 is capable of receiving global positioning system (GPS) signals, and processor 6 is capable of deriving a position result based on the GPS signals, using software stored in memory 8. Processor 6 is also arranged to determine a parameter associated with the expected error in the position result as, for example, the number of satellite signals received and used in arriving at such result.

Network 20 includes a plurality of base stations, such as cell phone towers 22, 24, 26 and 28 at diverse locations. Each base station includes equipment 30 for monitoring signal characteristics or broadcasting a signal of pre-selected characteristics as required in at least one individual position-determining scheme. For example, the base stations may be configured to operate in an angle of arrival determining scheme, in which case equipment 30 at each base station would include a phased-array antenna at each station and a circuit capable of measuring the difference in time of arrival at the different elements.

Alternatively or additionally, the base stations may be arranged to operate in a time of arrival monitoring scheme, in which case the equipment 30 at each base station would include conventional devices for monitoring the time of arrival of a signal at the station using a network-wide master clock or a local clock synchronized with such a network-wide master clock, so that the times of arrival determined at each station can be compared with the time of arrival determined at every other station.

The equipment 30 at each base station may also include equipment for measuring signal parameters associated with the suitability of the signals for use in a position-determining scheme. For example, the equipment 30 used in a time-of-arrival or angle-of-arrival scheme may include equipment for measuring the strength of the received signals.

The position determining entity (PDE) 14 includes one or more computer processors 36 connected to base stations 22, 24, 26, 28, and a memory 38 connected to these processors. The memory 36 holds software which instructs the processor 36 to perform the functions required to derive a position result for each individual position measuring scheme implemented in the network components. For example, where the network implements a time-of-arrival scheme, the memory may contain data representing the physical locations of the base stations and instructions for calculating a position result in a conventional manner based on the differences in time of arrival at the various base stations and the locations of the base stations.

Figure 3:
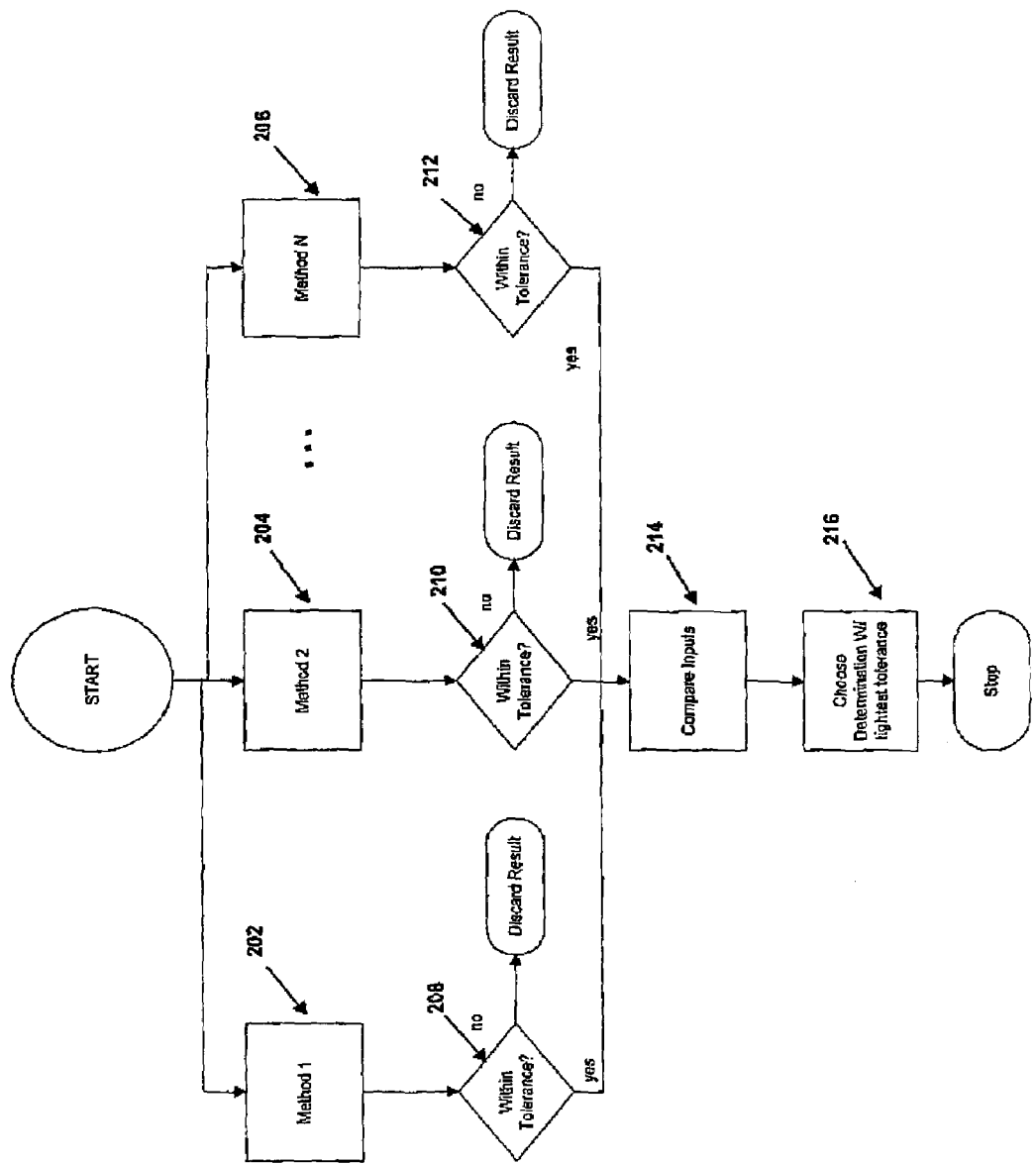
FIG. 3 is a flow chart depicting a method of making position determinations.
Figure 4:
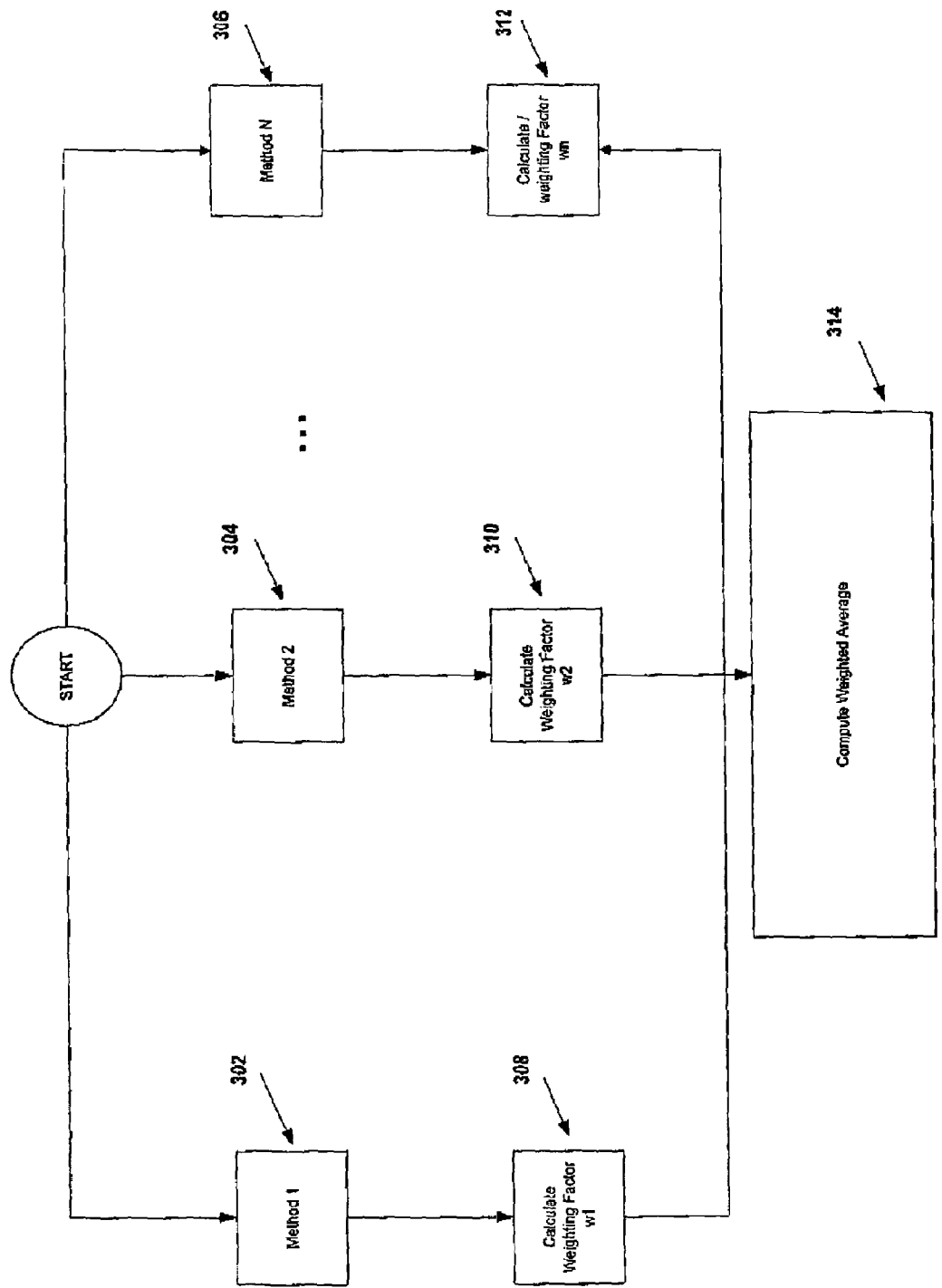
FIG. 4 is a flow chart depicting a method of making position determinations.

As further explained below in connection with FIGS. 2-4, the PDE processor 36 also performs the functions of determining position based on selection of one position result determined by one position determining scheme from a plurality of results derived using different schemes or based on a combination of such plural results. The element of the processor which performs these functions, referred to herein as a controller, is shown as a separate functional element at 40.

This portion of the processor may include the same physical structures as are used for other functions, or may include separate physical structures. The controller operates according to instructions and data stored in memory 38. Also, the processor 36 and memory 38 may be physically dispersed. For example, memory 38 may be linked to the processor through communications network 20 or through another public or private network (not shown) as, for example, through the internet. The elements of the processor also may be physically dispersed and linked in any suitable manner.

Figure 2:
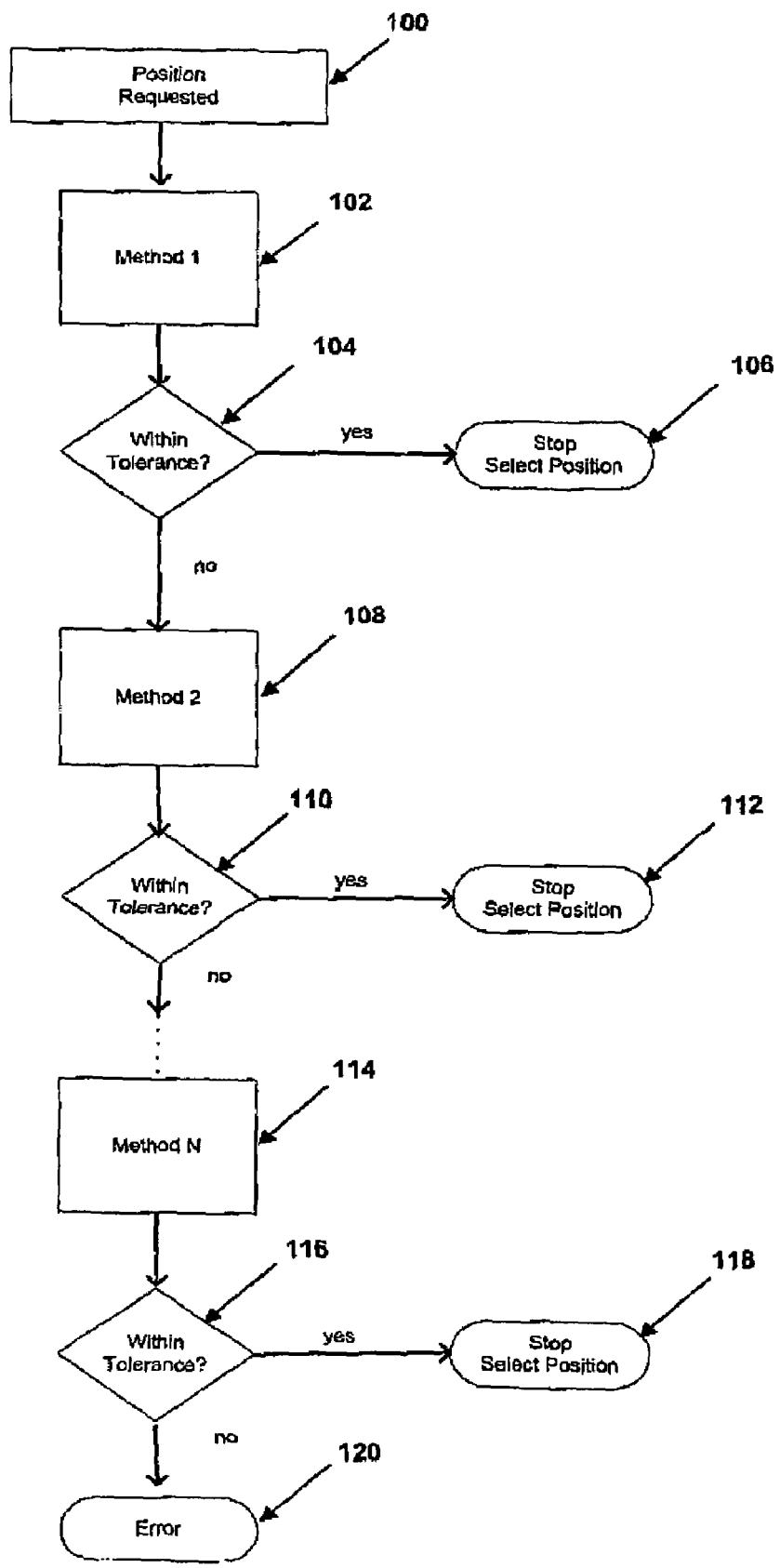
FIG. 2 is a flow chart depicting a method of making position determinations.

FIG. 2 illustrates a flowchart depicting a method of making position determinations, using a system as discussed above with reference to FIG. 1. The method begins (step 100) when PDE 14 receives a request to determine the position of mobile station 2. Such a request may be input as a user command at the mobile station, or may be initiated by another source. For example, where the system is a cellular telephone system linked to a public safety answering point (PSAP) the request may come from the PSAP or may be initiated automatically whenever the mobile station is in communication with the PSAP as, for example, when the mobile station user dials "911" in the United States.

The PDE sends a command to the base stations, mobile station or both to collect data and derive a position result according to a first position determination scheme. (step 102) The position result returned by the first scheme is then tested for acceptability (step 104) according to one or more predetermined criteria. For example, where the first scheme is conventional GPS location, the PDE may command the processor 6 of mobile station 2 to attempt to derive the position of the mobile station based on GPS signals received at the mobile station, and to communicate the derived position result to PDE 14 through network 20 along with data indicative of the quality of the result, such as data indicating the number of satellite signals received and used in deriving the result.

The PDE may apply an acceptance criterion based on the number of satellite signals used in deriving the result. For example, the criterion may specify that a result derived using four or more satellite signals is acceptable, whereas a position result derived using three satellite signals is not acceptable, and that a position result indicating that no position could be determined is also not acceptable.

In another scenario, a user may be lost and may locate himself/herself by invoking position determination wherein processor 6 uses MS-Based/Standalone GPS methodology. However, due to signal unavailability or a weak GPS signal, the MS-Based/Standalone method may fail. Mobile station 2 can direct processor 6 to use a method which uses AFLT measurements in addition to GPS measurements, i.e. a MS-Assisted mode, to increase the probability of obtaining a position fix.

Alternatively or additionally, a direct estimate of error may be included in the position result. For example, a position result may be expressed in terms of latitude and longitude together with an accuracy indication or error estimate of plus or minus a number of feet or meters. In the case of a GPS result using more satellite signals than the minimum required to derive a position result, the processor of the mobile unit or the PDE may obtain an estimate of error by comparing the position results derived from various subsets of the available satellite signals.

The criteria for acceptability may include an acceptable tolerance was ±75 feet, in which case a returned result accompanied by an estimate of error of ±50 feet, would be found acceptable since it is within the tolerance of ±75 feet whereas a position result accompanied by an error estimate of ±75 feet would be found to be unacceptable.

Yet another criterion which may be applied is comparison with previously-determined position of the mobile station. Memory 38 can hold historical positioning data representing a previously-determined position of mobile unit 2 and the time of such previous determination. The acceptance criteria may include a criterion such that a position result differing from a previously-determined position greater than a threshold limit per unit time since the last determination is regarded as unacceptable.

For instance, if a position result returned by the GPS scheme shows a ground-based mobile station at a position 10 miles from a position determined 2 seconds previously, such result may be deemed unacceptable. In a variant of this approach position determinations taken closely together may be averaged together so to calculate a moving average or compared with one another to establish an average velocity of the mobile station.

Any or all of the foregoing criteria, and other criteria, may be applied in step 104.

If the position result returned by the first scheme is acceptable, the PDE 14 selects that result and as the position of the mobile station (step 106). The accepted result is communicated by the PDE to the mobile station, to a PSAP or to any other appropriate destination as the position determined by the method, and the method terminates. The determined position may be expressed in the form of latitude and longitude, or converted to a street address or map grid location or any other suitable form.

However, if the position result returned by the first scheme is not acceptable, then the method branches to step 108. In this step, the PDE 14 commands the base stations and/or the mobile unit to perform a second position-determining scheme different from the first position-determining scheme.

For example, if the first position-determining scheme used GPS, the second position-determining scheme may use time difference of arrival. The times of signal arrival at the various base stations 22, 24, 26, 28 are determined and communicated to PDE 14, which calculates a position result unit based on these time differences. Here again, the information reported to PDE 14 or compiled at PDE 14 may include data about the signal measurements used to derive the position result, such as the number of base stations receiving the signal, the strength of the signals received at the various base stations and the like, and optionally may also include a direct estimate of the error in the position result. Here again, the controller compares the position result with acceptance criteria and determines whether the position result returned by the second scheme is acceptable (step 110).

The criteria applied in this step may include some or all of the same criteria as discussed above in connection with step 104, or may include variations of these. For example, in a time difference of arrival scheme, acceptance criteria may include a requirement for receipt of the signal with a certain minimum signal strength at least 3 base stations. If the position result returned by the second position-determining scheme is acceptable, the controller 40 selects that position result as the position determined by the method and communicates that position (step 112) in the same manner as discussed above in connection with step 106.

If the position result returned by the second scheme is not acceptable, the process continues using further repetitions of the position-deriving step using further different schemes for deriving position results (step 114), and further determinations of acceptability (step 116) until an acceptable position result is found and communicated (step 118) in the same manner as discussed above or until all of the n position determining schemes possible using the equipment included in the system has been used. If the nth scheme is completed without returning an acceptable positioning result, the controller 40 returns an error message (step 120) and the method ends.

In a variant, the order in which the method uses different schemes may be adjusted based on the results achieved. If a particular scheme is found to give acceptable results in the sequence of steps discussed above, that scheme may be placed first in the order of use. Thus, when another position request is received by PDE 14, and the sequence of steps discussed above is initiated again, that scheme will be used in the first position-determining step. It is likely that such scheme will give acceptable results. By using a previously-successful scheme as the first scheme, the system minimizes the number of times it must "hunt" through a plurality of schemes before finding an acceptable scheme.

In a variant, the method may begin again (return to step 102) instead of, or in addition to, returning the error message. In a further variant, in the event that all n methods have been used without finding an acceptable position result, the system may select the best position result from among the available results. For example, where all of the position results are accompanied by data representing an estimate of error, the system may choose the position result associated with the smallest estimate of error and communicate that result.

In a method according to another embodiment, the controller 40 actuates the components of the system to perform all N position-determining schemes in parallel and selects one position result from among the position results returned. FIG. 3 illustrates a flowchart depicting this method.

Position determinations according to n schemes are carried out in parallel (steps 202, 204, 206). Each position result is tested against pre-selected acceptability criteria as discussed above (steps 208, 210, 212) and unacceptable results are discarded. Acceptable results are compared (step 214), and the best result is selected according to a predetermined measure of merit (step 216). For example, where the results are accompanied by estimates of error, the result associated with the lowest estimated error is selected.

Alternatively, the controller may assign an estimate of error or other figure of merit to each result based upon a known or assumed relationship between conditions associated with such result and the accuracy of the result. For example, the controller may assign a more favorable figure of merit (such as a low estimate of error) to a result derived from angle of arrival at four base stations and a less favorable figure of merit (such as a high estimate of error) to an angle of arrival result based on signals received at three base stations. The selected position result is communicated as the position determined by the method (step 220).

In a variant of this method, the step of determining acceptability of each result and discarding unacceptable results (steps 208-212) are omitted, and all results are passed to the comparison step with estimates of error or other figures of merit.

In a method according to another embodiment, (FIG. 4) plural position results are obtained using different position-determining schemes (steps 302-306), and an estimate of error or other figure of merit is determined for each result in the manner discussed above (steps 308-312). Each position result is considered a random variable with a stated measure of confidence embodied in the estimate of error (accuracy estimates) or other figure of merit. The various results are combined (step 314) with one another to yield a combined result using a combining algorithm which gives different weights to the various individual results according to this measure of confidence.

In one such combining algorithm, an average, weighted according to the level of confidence, is calculated for these position random variables. If, for example, n (n being an integer) readings were taken by n different schemes, $w_1$, $w_2, \ldots, w_n$ represent the weighting factors attributed to each position result and $x_1, x_2, \ldots, x_n$ represent position result, the weighted average can be expressed as follows: $w_1x_1+w_2x_2+w_3x_3/(w_1+w_2+w_3)$.

In order to accord a greater weight to a position measurement with a high indication of accuracy, (and conversely accord the measures with the least confidence a smaller weight) the reciprocals of the accuracy indications can be used as weighting factors in calculation of a weighted average. Consequently, should $x_1$ have an accuracy of ±5 feet, $x_2$ have an accuracy of ±50 feet and $x_3$ have an accuracy of ±10 feet, weighting factors $w_1$, $w_2$, and $w_3$ would have values of 0.2, 0.02, and 0.1, respectively. The $x_1$ reading is given the greatest amount of weight followed by $x_2$ and $X_3$ readings. The weighting factors can be calculated using other methods. For instance, the squares of the reciprocal of the accuracy indication can be used for the weighting factors.

In yet another embodiment, the foregoing described position location methodology can be implemented by a mobile station and/or by the Network/PDE in conjunction with the mobile station.

Figure 5:
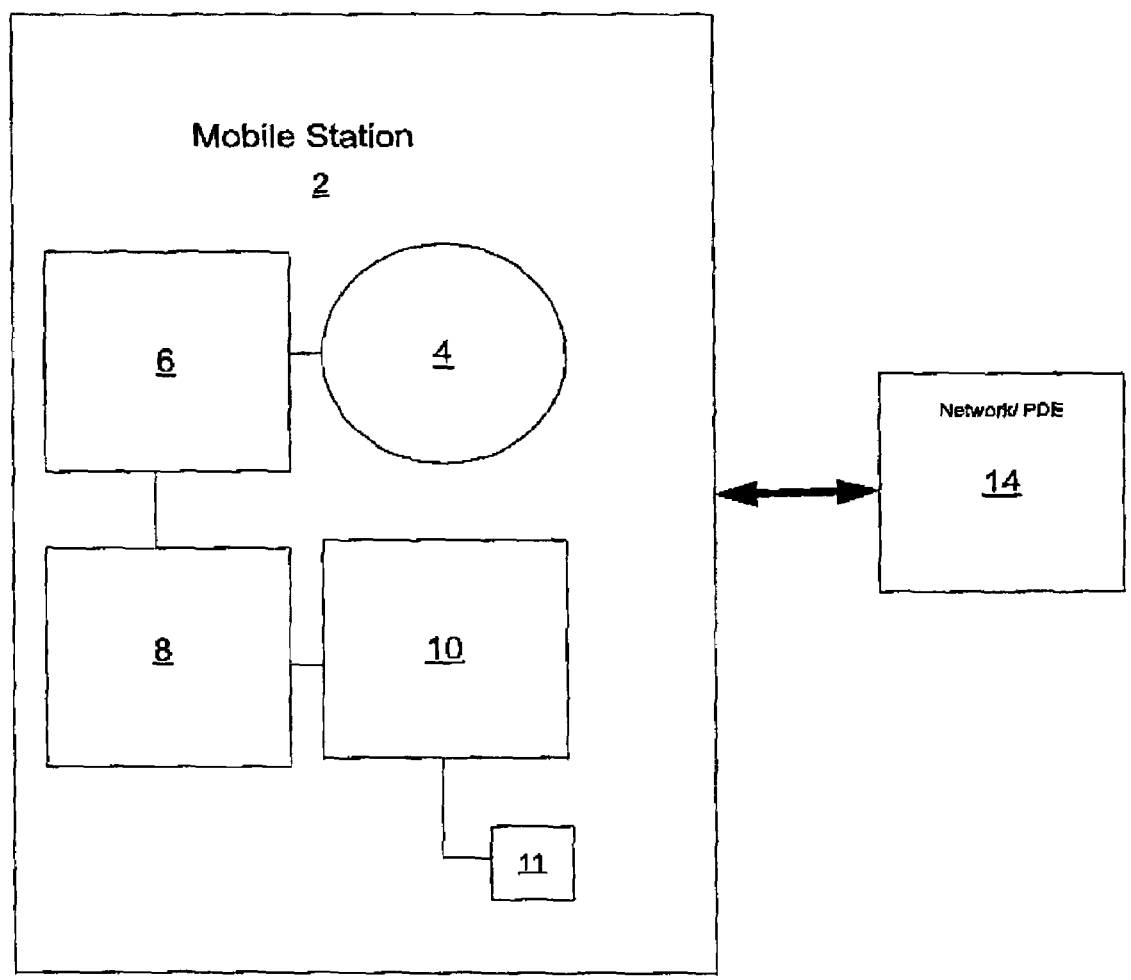
FIG. 5 is a block diagram of the interaction of a mobile station with a network/PDE.

FIG. 5 illustrates a block diagram of the interaction of mobile station 2 with Network/PDE 14. Mobile station 2 includes position determination mode multiplexer 4, processor 6, memory 8, transceiver (transmitter/receiver) 10 and display 11. In one aspect, mobile station 2 will attempt to determine its position, within a pre-specified tolerance, using a Network/PDE method as directed by processor 6. Should the position determination not achieve the pre-specified tolerance then multiplexer 4 dynamically switches modes in an effort to obtain a position fix, of suitable accuracy, using another position determination method.

The position location mode selected by switch 4 can employ a methodology based in the mobile station 2, i.e., MS-Based/Standalone mode (e.g., GPS) or a methodology based in the MS-Assisted mode using transceiver 10 to communicate with network/PDE 14. Double arrow 12 signifies the interaction of the network/PDE with mobile station 2 for the MS-Assisted mode of operation. In connection with a position being determined for mobile station 2, in one embodiment of the invention, the location can be shown on display 11 of mobile station 2. Alternatively, the position can be forwarded and/or determined at network/PDE 14.

Memory 8 can hold historical positioning data. Processor 6 is programmed to direct the operation of multiplexer 4. In conjunction with the storage of previous mobile station location readings in memory 8, should the current position readings change above a threshold limit, within a predetermined time period, such may indicate a significant error in position measurement. Processor 6 can provide a response necessitating the determination of the mobile station position by another method. For instance, after 2 seconds, should the mobile station move 10 miles, this determination is likely erroneous especially where mobile station 2 is ground based. Alternatively, memory 8 can allow position determinations taken closely together in time to be averaged together so as to calculate a moving average. Although this provides a smoothing effect regarding changes in position over time, this method can introduce some error. For some applications of position determination, this error may be acceptable.

Mobile station position determination can be accomplished by choosing different methods wherein each method comprises one or more schemes. For instance a GPS MS-Assisted method can comprise GPS or GPS combined with AFLT. A network-based method can comprise TDCOA or AOA or a combination of both, while a GPS MS-Based/Standalone method may use, for instance, GPS only.

Conventional attempts at making mobile station position determinations fail entirely if for some reason the particular position determination method fails. Mobile station position determination according to the invention permits methodologies which contain different position determination schemes different from or in addition to a particular scheme that for some reason may fail to determine the position of the mobile station.

Availability of a successful position determination scheme thereby increases using the invention as compared with conventional methods. Further, the invention permits the use of different resources for position determination, using the same scheme, from that which would otherwise fail using another resource.

Although the invention herein has been described with reference to particular embodiments, it is to be understood that these embodiments are merely illustrative of the particular principles and applications. For example, the particular position-determining schemes referred to in connection with FIGS. 1-4 are merely illustrative; any of the numerous known individual position-determining schemes can be used. For example, trilateration schemes in which use time of arrival of signals from multiple base stations can be used. Desirably, the various position-determining schemes rely, in whole or in part, on different physical measurements of signal characteristics, different signals, or both. Also, the functions performed by the PDE 36 and controller 40 in the examples discussed above can be performed in whole or in part by elements of the mobile station 2. Stated another way, the processor 6 of the mobile station can include functional elements which perform the functions of the controller 40. Also, the position-determining method can be performed to determine the positions of multiple mobile stations simultaneously or sequentially. The techniques described herein can be implemented in essentially any network, such as not only CDMA systems but also in time division multiple access (TDMA) systems or frequency division multiple access systems (FDMA) or space division multiple access (SDMA) systems. It is therefore to be understood that numerous modifications may be made to the illustrative embodiments and that other arrangements may be devised without departing from the spirit and scope of the present invention as defined by the appended claims.

The invention claimed is:

1. A method of obtaining the position of a mobile station comprising:
(a) determining the position of the mobile station using a first scheme of position determination selected from schemes consisting of GPS, trilateration, server assisted GPS, enhanced signal strength, angle of arrival, time difference of arrival, forward link trilateration, advanced forward link trilateration, fingerprinting, and combinations thereof;

(b) determining whether the position of the mobile station using said first scheme yields an acceptable position; and (c) repeating determining the position of the mobile station, only if the first scheme does not yield an acceptable position result, using at least one further scheme of position determination different from said first scheme in at least some repetitions until (i) a repetition returns an acceptable position result or (ii) all available position-determining schemes have been used.

2. The method of claim 1 wherein said mobile station is a mobile communications device selected from the group consisting of a mobile phone, a personal digital assistant with wireless communications capability, a portable computer with wireless communications capability, a pager, and other personal communications devices.

3. The method of claim 1 wherein at least one of said position-determining schemes is a mobile station-based stand-alone scheme.

4. The method of claim 3 wherein at least one of said position-determining schemes is a mobile assisted-based scheme.

5. The method of claim 1 wherein at least one of said position-determining schemes is a mobile assisted-based scheme.

6. The method of claim 1 further comprising deciding if each said determination has yielded an acceptable position result.

7. The method of claim 6 further comprising deriving an estimate of error associated with each position result, wherein said deciding whether if each determination has yielded an acceptable position result includes comparing an estimate of error associated with such position result to a predetermined tolerance.

8. The method of claim 7 wherein said predetermined tolerance is, +−0.50 feet.

9. The method of claim 7 wherein at least one said scheme includes monitoring a characteristic of signals transmitted between said mobile station and a plurality of base stations, and said deriving an estimate of error includes determining a number of base stations included in said monitoring.

10. A method of determining the position of a mobile station comprising;
determining a position for said mobile station according to a plurality of different position determination schemes, said schemes being selected from schemes consisting of GPS, trilateration, server assisted GPS, enhanced signal strength, angle of arrival, time difference of arrival, forward link trilateration, advanced forward link trilateration, fingerprinting, and combinations thereof;
determining an estimate of error for each position determination scheme;
choosing one said position determination scheme having a smallest estimate of error; and
selecting as the position of the mobile station a position result provided by the chosen position determination scheme.

11. The method of claim 10 wherein said mobile station is a mobile communications device selected from the group consisting of a mobile phone, a personal digital assistant with wireless communications capability, a portable computer with wireless communications capability, a pager, and other personal communications devices.

12. The method of claim 10 wherein at least one of said schemes is a mobile station-based stand-alone scheme.

13. The method of claim 12 wherein at least one of said schemes is a mobile assisted-based scheme.

14. The method of claim 10 wherein at least one of said schemes is a mobile assisted-based scheme.

15. The method of claim 10 further comprising deciding whether each said determination has yielded an acceptable position result, said choosing including choosing between only the acceptable position results.

16. The method of claim 10 wherein at least one of said position determination schemes includes monitoring a characteristic of signals transmitted between said mobile station and a plurality of base stations, and said choosing includes determining a number of base stations included in said monitoring.

17. A method of determining the position of a mobile station comprising:
determining a position for said mobile station according to n different schemes selected from the group consisting of GPS, trilateration, server assisted GPS, enhanced signal strength, angle of arrival, time difference of arrival, forward link trilateration, advanced forward link trilateration, fingerprinting, and combinations thereof, n being an integer, so as to provide a plurality of different position results; and
calculating the position of said mobile station by combining a plurality of said position results.

18. The method of claim 17 further comprising deriving an estimate of the error for each said position result, said calculating includes combining said plurality of position results based at least in part on said estimates of error.

19. The method of claim 18 wherein said combining involves computing a weighted average of the position results using weighting factors based on said estimates of error.

20. The method of claim 18 wherein said weighting factors are the reciprocals of the estimates of errors.

21. A method of claim 20 where said weighting factors are the squares of the reciprocals of the estimates of errors.

22. A system for determining the position of a mobile station comprising:
a mobile station;
a network adapted to communicate with said mobile station by radio signals;
a position determination entity in communication with one or both of said network and said mobile station said mobile station, network and position determining entity being operable to derive a position result representing the position of said mobile station by plurality of available position-determining schemes, said schemes being selected from the group consisting of GPS, trilateration, server assisted GPS, enhanced signal strength, angle of arrival, time difference of arrival, forward link trilateration, advanced forward link trilateration, fingerprinting, and combinations thereof; and
a controller in communication with said position determining entity, said controller being operable to actuate said position determining entity, network and mobile station to derive a position result according to a first scheme representing the position of the mobile station, determine if the position result according to the first scheme is acceptable and, if not, to actuate said position determining entity, network and mobile station to derive a position result according to at least one further scheme different from said first scheme until either all available position-determining schemes have been used or an acceptable position result has been obtained.

23. A system for determining the position of a mobile station comprising:
a mobile station;
a network adapted to communicate with said mobile station by radio signals; a position determination entity in communication with one or both of said network and said mobile station said mobile station, network and position determining entity being operable to derive a position result representing the position of said mobile station by plurality of available position-determining schemes, said schemes being selected from the group consisting of GPS, trilateration, server assisted GPS, enhanced signal strength, angle of arrival, time difference of arrival, forward link trilateration, advanced forward link trilateration, fingerprinting, and combinations thereof; and
a controller in communication with said position determining entity, said controller being operable to actuate said position determining entity, network and mobile station to derive position results representing the position of the mobile station according to more than one of said schemes and select one of said position results.

24. A system for determining the position of a mobile station comprising:
a mobile station;
a network adapted to communicate with said mobile station by radio signals;
a position determination entity in communication with one or both of said network and said mobile station said mobile station, network and position determining entity being operable to derive a position result representing the position of said mobile station by a plurality of available position-determining schemes, said schemes being selected from the group consisting of GPS, trilateration, server assisted GPS, enhanced signal strength, angel of arrival, time difference of arrival, forward link trilateration, advanced forward link trilateration, fingerprinting, and combinations thereof; and
a controller in communication with said position determining entity, said controller being operable to actuate said position determining entity, network and mobile station to derive position results representing the position of the mobile station according to more than one of said schemes and compute the position of said mobile station by combining said results.

25. The system of claim 24 wherein said network is adapted to communicate with said mobile station through a technique selected from a group of radio-channel access schemes consisting of CDMA, TDMA, FDMA, SDMA, and a combination thereof.

26. The system of claim 24 wherein said mobile station is a mobile communications device selected from the group consisting of a mobile phone, a personal digital assistant with wireless communications capability, a portable computer with wireless communications capability, a pager, and other personal communications devices.

27. A mobile station comprising:
a position determination mode multiplexer for choosing a position determination methodology for determining the position of said mobile station, said position determination mode multiplexer being operable to choose between mobile station stand-alone and mobile station-network assisted position determination methods;
a transmitter and a receiver for providing communications via radio channel access with said network; and
a processor for directing said multiplexer, said processor being operable to select a method of position determination from different schemes consisting of GPS, trilateration, server assisted GPS, enhanced signal strength, angle of arrival, time difference of arrival, forward link trilateration, advanced forward link trilateration, fingerprinting, and combinations thereof.

28. The mobile station of claim 27 wherein said radio channel access is provided through a technique selected from the group of radio channel access schemes consisting of CDMA, TDMA, EDMA, SDMA, and a combination thereof.

29. The mobile station of claim 27 wherein said methods are selected from the group of methods consisting of GPS trilateration, server assisted GPS, enhanced signal strength, angle of arrival, time difference of arrival, forward link trilateration, advanced forward link trilateration, fingerprinting, and combinations thereof.

30. The mobile station of claim 27 wherein said mobile station is a mobile communications device selected from the group consisting of a mobile phone, a personal digital assistant with wireless communications capability, a portable computer with wireless communications capability, a pager, and other personal communications devices.

31. A method of obtaining the position of a mobile station, comprising:
(a) determining the position of the mobile station using a first scheme of position determination selected from mobile station based/standalone GPS schemes;
(b) determining whether the position of the mobile station using said first scheme yields an acceptable position; and
(c) repeating determining the position of the mobile station, only if the first scheme does not yield an acceptable position result, using at least one further scheme of position determination selected from schemes consisting of trilateration, server assisted GPS, enhanced signal strength, angle of arrival, time difference of arrival, forward link trilateration, advanced forward link trilateration, fingerprinting, and combinations thereof, different from said first scheme in at least some repetitions until (i) a repetition returns an acceptable position result or (ii) all available position-determining schemes have been used.

32. The system of claim 23, wherein the network is linked to a public safety answering point (PSAP).

33. A non-transitory machine-readable medium comprising instructions, which, when executed by a processor. cause the processor to perform operations to obtain a position of a mobile station, the instructions comprising:
instructions to determine the position of the mobile station using a first scheme of position determination selected from schemes consisting of GPS, trilateration, server assisted UPS, enhanced signal strength. angle of arrival, time difference of arrival, forward link trilateration, advanced forward link trilateration, fingerprinting, and combinations thereof;
instructions to determine whether the position of the mobile station using said first scheme yields an acceptable position; and
instructions to repeat determine the position of the mobile station, only if the first scheme does not yield an acceptable position result, using at least one further scheme of position determination different from said first scheme in at least some repetitions until (i) a repetition returns an acceptable position result or (ii) all available position-determining schemes have been used.

34. A non-transitory machine-readable medium comprising instructions, which, when executed by a processor, cause the processor to perform operations to obtain a position of a mobile station, the instructions comprising:

instructions to determine a position for said mobile station according to a plurality of different position determination schemes, said schemes being selected from schemes consisting of GPS, trilateration, server assisted GPS, enhanced signal strength, angle of arrival, time difference of arrival, forward link trilateration, advanced forward link trilateration. fingerprinting, and combinations thereof;

instructions to determine an estimate of error for each position determination scheme;

instructions to choose one said position determination scheme having a smallest estimate of error; and instructions to select as the position of the mobile station a position result provided by the chosen position determination scheme.

35. A non-transitory machine-readable medium comprising instructions, which, when executed by a processor, cause the processor to perform operations to obtain a position of a mobile station, the instructions comprising:

instructions to determine a position for said mobile station according to n different schemes selected from the group consisting of GPS, trilateration, server assisted GPS, enhanced signal strength, angle of arrival, time difference of arrival, forward link trilateration, advanced forward link trilateration, fingerprinting, and combinations thereof, n being an integer, so as to provide a plurality of different position results; and instructions to calculate the position of said mobile station by combining a plurality of said position results.

36. A non-transitory machine-readable medium comprising instructions, which, when executed by a processor, cause the processor to perform operations to obtain a position of a mobile station, the instructions comprising:

instructions to determine the position of the mobile station using a first scheme of position determination selected from mobile station based/standalone GPS schemes;

instructions to determine whether the position of the mobile station using said first scheme yields an acceptable position; and instructions to repeat determining the position of the mobile station, only if the first scheme does not yield an acceptable position result, using at least one further scheme of position determination selected from schemes consisting of trilateration, server assisted GPS, enhanced signal strength, angle of arrival, time difference of arrival, forward link trilateration, advanced forward link trilateration. fingerprinting, and combinations thereof, different from said first scheme in at least some repetitions until (i) a repetition returns an acceptable position result or (ii) all available position-determining schemes have been used.

37. An apparatus for obtaining the position of a mobile station comprising:

means for determining the position of the mobile station using a first scheme of position determination selected from schemes consisting of GPS, trilateration, server assisted GPS, enhanced signal strength, angle of arrival, time difference of arrival, forward link trilateration, advanced forward link trilateration, fingerprinting, and combinations thereof;

means for determining whether the position of the mobile station using said first scheme yields an acceptable position; and means for repeating determining the position of the mobile station, only if the first scheme does not yield an acceptable position result, using at least one further scheme of position determination different from said first scheme in at least some repetitions until (i) a repetition returns an acceptable position result or (ii) all available position-determining schemes have been used.

38. An apparatus for determining the position of a mobile station comprising:

means for determining a position for said mobile station according to a plurality of different position determination schemes, said schemes being selected from schemes consisting of GPS, trilateration, server assisted GPS, enhanced signal strength, angle of arrival, time difference of arrival, forward link trilateration, advanced forward link trilateration, fingerprinting, and combinations thereof;

means for determining an estimate of error for each position determination scheme;

means for choosing one said position determination scheme having a smallest estimate of error; and means for selecting as the position of the mobile station a position result provided by the chosen position determination scheme.

39. An apparatus for determining the position of a mobile station comprising:

means for determining a position for said mobile station according to n different schemes selected from the group consisting of GPS, trilateration, server assisted GPS, enhanced signal strength, angle of arrival, time difference of arrival, forward link trilateration, advanced forward link trilateration, fingerprinting, and combinations thereof, n being an integer, so as to provide a plurality of different position results; and means for calculating the position of said mobile station by combining a plurality of said position results.

* * * * *